Jan. 29, 1952     F. F. SUELLENTROP     2,584,063
APPARATUS FOR MANUFACTURING WHIPPED CREAM
Filed March 7, 1949     3 Sheets-Sheet 1
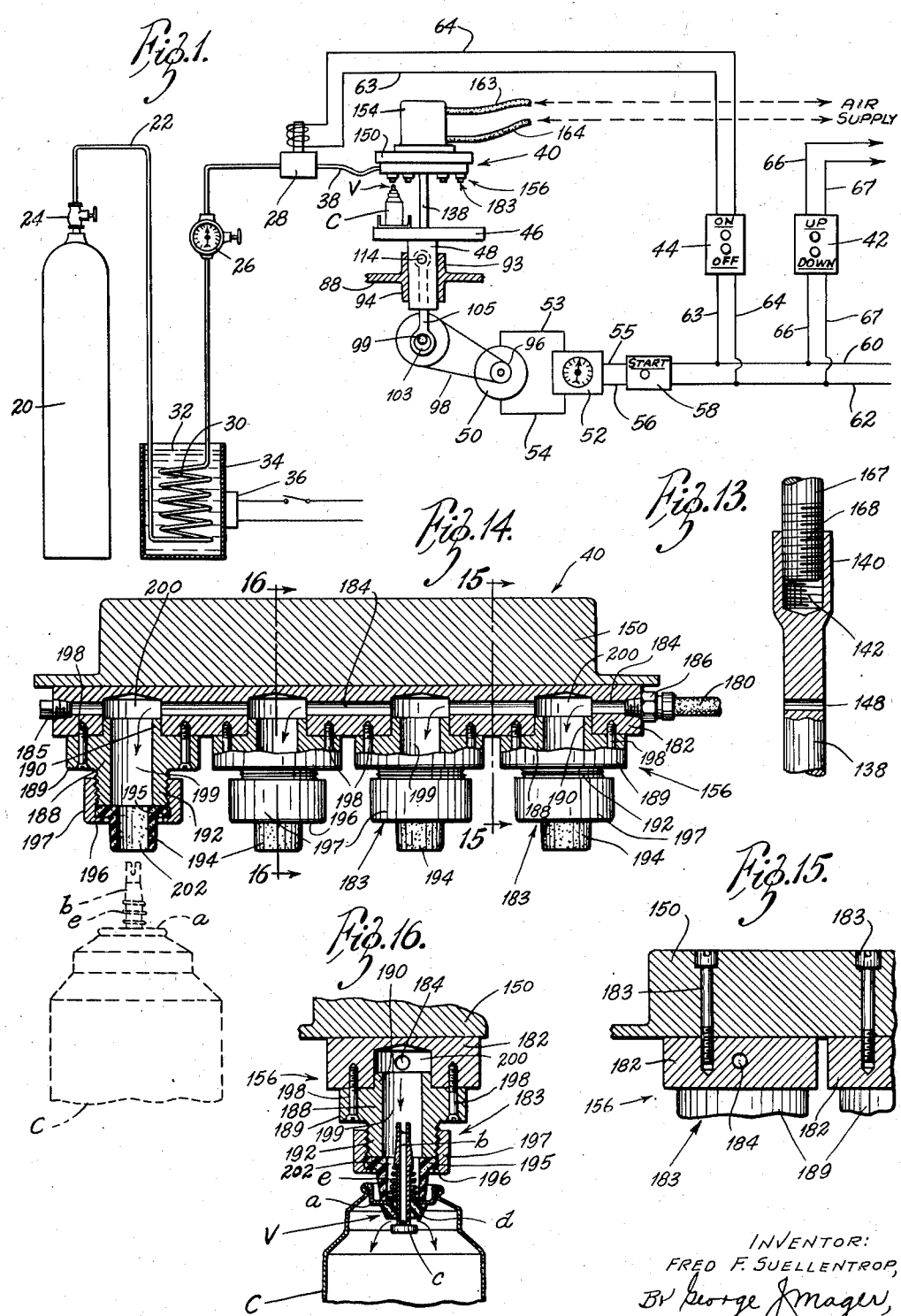
INVENTOR:
FRED F. SUELLENTROP,
By George J. Mager,
HIS ATTORNEY.

Jan. 29, 1952      F. F. SUELLENTROP      2,584,063
APPARATUS FOR MANUFACTURING WHIPPED CREAM
Filed March 7, 1949      3 Sheets-Sheet 2
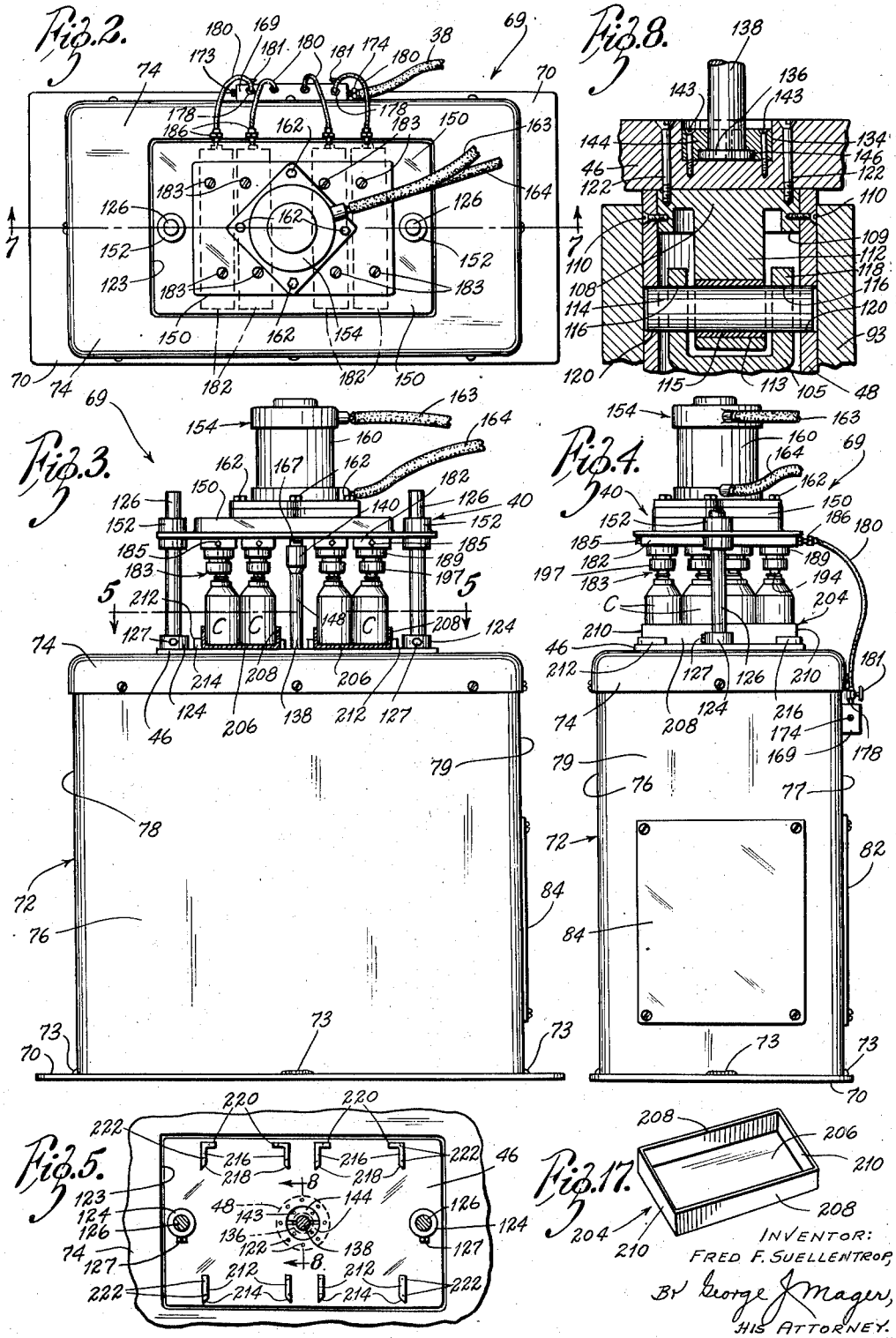
INVENTOR:
FRED F. SUELLENTROP,
BY George J. Mager,
HIS ATTORNEY.

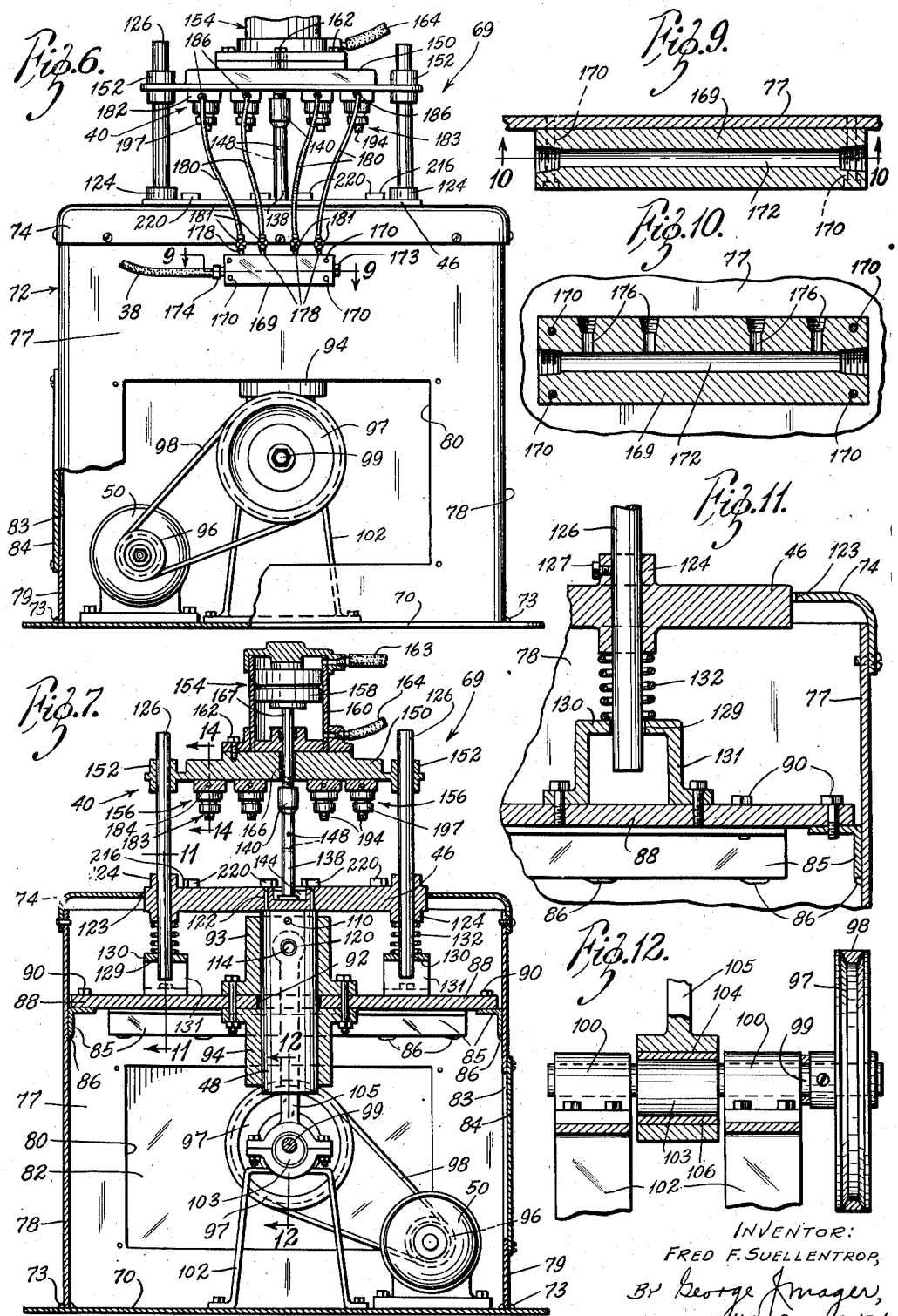

Patented Jan. 29, 1952

2,584,063

UNITED STATES PATENT OFFICE 2,584,063

APPARATUS FOR MANUFACTURING WHIPPED CREAM

Fred F. Suellentrop, Lemay, Mo., assignor to Lemay Machine Company, Lemay, Mo., a corporation of Missouri Application March 7, 1949, Serial No. 80,038

8 Claims. (Cl. 226—72)

Generally, the present invention relates to the manufacture of whipped cream for domestic consumption. That is to say, the invention provides for the housewife a ready supply of whipped cream in a container which may be kept in the refrigerator, available for immediate use.

More particularly, the invention relates to a novel apparatus for sealing within a self-dispensing container, a quantity of whipped cream which when dispensed, compares more than favorably with whipped cream produced by domestic appliances. Needless to say, the housewife is spared the labor involved in whipping the cream, cleansing the whipping device, and so on.

The present invention makes available to the housewife a quantity of whipped cream in a handy container, dispensable in whole, or in part, at will. The container may be purchased at a grocery store, delicatessen, drug store and the like, placed in a domestic refrigerator, or otherwise stored in a cool place, and brought forth whenever whipped cream is desired.

It is not requisite that the entire contents of the container be dispensed within any given period of time. Thus for example, assuming that approximately forty per cent of the container's total content has been served, the remaining sixty per cent will be available at a future time, it being only necessary to place said container in a cool place during the interim, and so on.

Primarily therefore, this invention relates to apparatus for releasably sealing within a self-dispensing container a predetermined amount of whipped cream, and providing within said container the means whereby desired quantities of the cream may be dispensed at will.

From a sanitary standpoint, the ultimate product leaves nothing to be desired. A specified quantity of pasteurized cream is introduced into a sterilized container, preferably by mechanical means; a sterilized valve assembly is fitted onto the open top of the container, also by mechanical means; and the cream thus releasably sealed within the container is thereupon fluffed or whipped simultaneously with the introduction into the container, of a gas under predetermined pressure, as will appear.

In other words, the present invention provides novel apparatus whereby the cream is fluffed within the container in which it is to be sold for use at a future date, and whereby the cream is preserved in fluffed state within the container until is is dispensed.

It is noted that the dispensing container herein referred to, is of the type disclosed in the copending application of Aaron S. Lapin, Serial No. 6,767, filed February 6, 1948.

A more comprehensive description of the invention follows, reference being had also to the accompanying drawings in which:

Fig. 1 is a diagram presenting a general layout or schematic plan of the invention;

Fig. 2 is a top plan view of a combined gasser and agitator assembly embodying the principal apparatus of the invention;

Fig. 3 is a front elevational view thereof;

Fig. 4 is a right end elevational view thereof;

Fig. 5 is a fragmentary view taken on line 5—5 in Fig. 3, certain elements being omitted to more clearly present structural details;

Fig. 6 is a rear elevational view of the machine, partly in section and broken away, and with the rear cover plate removed;

Fig. 7 is a vertical section taken approximately on line 7—7 in Fig. 2;

Fig. 8 is a fragmentary vertical sectional view on an enlarged scale, taken approximately on line 8—8 in Fig. 5;

Fig. 9 is a horizontal sectional view on an enlarged scale, taken on line 9—9 in Fig. 6, certain elements being omitted;

Fig. 10 is a vertical sectional view taken on line 10—10 in Fig. 9;

Fig. 11 is a fragmentary vertical sectional view on an enlarged scale, taken on line 11—11 in Fig. 7;

Fig. 12 is a similar view taken on line 12—12 in Fig. 7;

Fig. 13 is a vertical sectional view, on an enlarged scale, showing a piston rod adjustment means;

Fig. 14 is a vertical sectional view, on an enlarged scale, taken on line 14—14 in Fig. 7, the view including the upper portion of a container, which is shown in broken lines;

Fig. 15 is a fragmentary vertical sectional view taken on line 15—15 in Fig. 14;

Fig. 16 is a similar view taken on line 16—16 in Fig. 14, the view also including in vertical section, the upper portion of a container;

Fig. 17 is a perspective view of a tray adapted to snugly support eight containers in predetermined relation.

In Fig. 1, there is illustrated diagrammatically a conventional tank charged with a supply of nitrous oxide (approximately eighty-five per cent), and carbon dioxide (approximately fifteen per cent). The tank is designated by numeral 20, and from its upper end leads a gas supply line 22. A manually operable valve 24 is provided, whereby the supply of gas may be turned on or off, as is understood.

Line 22 passes through a conventional pressure-indicating and regulating guage 26, thence to a conventional solenoid-operated valve assembly 28.

To obviate freezing of the guage 26, and to insure accurate operation thereof, it has been found salutary to form a portion of line 22, between said guage and tank 20, into a coil 30 immersed in water 32. The water is contained in a suitable vessel 34, and its temperature is maintained at approximately 72 degrees Fahrenheit by means of an electric heating device 36, or in any other chosen manner.

From the valve 28 a flexible line 38 supplies the gas to a distributor assembly generally designated 40, which may be selectively elevated or lowered with respect to containers C, as will appear. Alternate ascent and descent of assembly 40 is effected by a manually operable switch 42, leading to a standard air pressure reversing mechanism, not shown. Selective opening or closing of valve 28 is effected by a manually operable switch 44.

As will hereinafter appear, the assembly 40 is associated with a vertically reciprocable container supporting plate or bed 46 secured to a piston 48, and operable by a motor 50. This motor is energized for a predetermined length of time only, being automatically controlled by a standard micro-flex reset timer device 52, connected thereto by leads 53 and 54. The timer 52 is connected by leads 55 and 56 to a manually operable switch 58.

Numerals 60 and 62 designate lines leading from a source of electrical power to switch 58. Leads 63 and 64 to solenoid valve 28, are connected with the power lines as shown, passing also through switch 44, as is understood. Leads 66 and 67 to an air pressure reversing device previously referred to, are also in the circuit as shown.

In practice, the three manually operable switches 42, 44, and 58, are mounted on a panel within convenient reach of the operator, which panel may also support the valve-guage 26, valve 28, and timer 52.

Distributor assembly 40, bed 46, piston 48, motor 50, and all the mechanism and structure associated therewith, are incorporated in a machine generally designated 69 in Figs. 2, 3, 4, 6, and 7. This machine includes a base 70, a housing or casing 72 preferably welded thereto along its lower edges as at 73, and a removable top cover 74.

Casing 72 includes a front wall 76, rear wall 77, left end wall 78, and right end wall 79. Rear wall 77 is provided with an access opening 80, normally closed by a removable cover plate 82. Right end wall 79 has a similar opening 83, therein, normally closed by removable cover plate 84.

Supported within the casing on four angle bars 85, one of which is welded to each wall of the casing as at 86, is a horizontally disposed rectangular plate 88, which as particularly seen in Fig. 11, is secured at intervals to the inwardly projecting top flanges of the angle bars as by tap bolts 90.

Rigidly secured to plate 88, in vertical alinement with a central opening 92 therein, is an upwardly projecting bearing sleeve 93, and a downwardly projecting bearing sleeve 94. With this arrangement, an open-ended cylinder is provided for the piston 48, as is clear from an inspection of Fig. 7.

Reciprocal motion is imparted to piston 48 by means of a belt and pulley connection with the motor 50, which as shown in Figs. 6 and 7, is bolted or otherwise secured to base 70 adjacent the right end wall 79.

Thus, the motor shaft has affixed thereto a relatively small pulley or sheave 96, which drives, at a reduced rate of speed, a larger sheave 97 by means of an endless belt 98. Pulley 97 is rigidly secured to one end of a horizontal shaft 99, which as best seen in Fig. 12, is rotatably supported in suitable spaced bearings 100, each of the latter being supported on an inverted U-shaped standard or bracket 102 rigidly attached to base 70, as shown.

Integral with shaft 99, and disposed between the bearings 100, is an eccentric 103, which passes through a circular opening 104 in the lower end of a connecting rod 105, the upper end of which terminates within piston 48. A bearing sleeve 106 is shown interposed in the opening 103 about the eccentric, to insure smooth operation. For superlative action, an annular series of needle bearings may be substituted for the bearing sleeve.

With particular reference now to Fig. 8, it is seen that piston 48 is in the form of a hollow cylinder, closed at the top by means of an annular insert 108. This insert has a depending flange 109, the outer periphery of which has a snug fit within the piston, as shown. An annular series of countersunk screws 110 rigidly secures the insert in position, so that its upper surface is flush with the upper end of the piston.

The member 108 includes a depending portion 112 provided with a horizontal bore 113 through which passes a wrist pin 114. A bearing sleeve 115 may be interposed in the opening about the wrist pin, or as in the case of eccentric 103, needle bearings may be substituted.

Wrist pin 114 also passes through alined openings 116 in the bifurcated upper end 118 of connecting rod 105, and into alined openings 120 in the piston wall.

From the foregoing, it should be evident that as shaft 99 is caused to revolve, eccentric 103 will actuate the connecting rod 105 to continuously reciprocate the piston 48, as long as the motor 50 is in operation.

As best seen in Fig. 8, supported on and secured by a circular series of countersunk screws 122 to the top of the piston, is the container supporting plate or bed 46. The bed 46 is of rectangular configuration in plan, and obviously reciprocates with the piston, there being provided in the cover plate 74 a rectangular opening 123 to accommodate the bed. As illustrated in Figs. 5, 7, and 11, opening 123 is of a size to provide a slight clearance around the entire peripheral edge of bed member 46.

On the longitudinal centerline, and in spaced relation relative to the transverse centerline thereof, the bed 46 is provided with a pair of bosses 124, each bored to receive a vertical guide pin 126, the function of which will appear.

As shown in Figs. 3 and 11, the pins 126 are rigidly secured to bed 46 as by set screws 127, or otherwise, so that the piston 48, bed 46, and the pair of guide pins 126 together form a unitary assembly reciprocable by the eccentric 103, when the latter is rotated as described.

Each pin 126 has a portion thereof projecting downwardly into the casing and slidable in an opening 129 provided in the horizontal, or web portion 130, of an inverted U-shaped bracket 131, bolted or otherwise secured to the plate 88. Interposed between each boss 124 and the web portion 130 of the bracket therebelow, is a compression spring 132 coiled about pin 126.

As will be noted hereinafter, the reciprocable assembly operates rapidly, and the springs 132 cushion the downstroke. It is to be understood however, that the machine will operate satisfactorily without the springs.

Reverting again to Fig. 8, it is noted that the bed 46 has formed therein centrally an annular depression or well 134, on the bottom of which rests the lower flange portion 136 of a vertical rod 138, the upper end of which is also enlarged as at 140, and internally threaded as at 142 (Fig. 13).

The lower end of rod 138 is secured to bed 46 by means of screws 143 passing through two segments of a split collar 144 into engagement with threaded apertures in said bed. As shown also in Fig. 5, the periphery of the split collar has a snug fit in the well, and its lower face is undercut or recessed as at 146 to accommodate the annular flange 136.

With this arrangement, it is obvious that the rod is held fast to the bed, although it may be rotated axially in either direction, for example by means of a tool inserted in one of a pair of transverse apertures 148 provided in the rod.

The gas distributor mechanism 40, includes a base member 150 provided with guide bosses 152 which are apertured for vertical sliding movements on the pins 126, an air cylinder 154, and a plurality of transversely disposed gas injecting assemblies which are generally designated 155. Air cylinder 154 is of the type wherein the piston 158 remains stationary, so that the cylinder 160 may be selectively elevated or lowered by the air under pressure introduced above or below the piston, as is understood.

Obviously also, in this type of equipment, the stroke of the cylinder in either direction is fixed. The device 154 is well known, and will not be described in detail. It is attached to base plate 150 by tap bolts 162. A flexible line 163 above, and a similar line 164 below the piston lead from a suitable air supply as indicated in Fig. 1.

Centrally of base member 150, there is formed a vertical aperture 166, through which the piston rod 167 projects. The lower end portion thereof is threaded as at 168, and is in engagement with the internal threads 142 of the enlarged head 140 formed on rod 138, as best seen in Fig. 13. Thus the distance obtaining between bed 46 and plate 150 may be varied by rotation of rod 138, as stated above.

With particular reference now to Figs. 6, 9, and 10, a rectangular block 169 in the nature of a manifold, is secured to the rear wall 77 by screws 170. The block 169 is bored centrally to provide a longitudinal passageway 172, threaded at one end to receive a plug 173, and at the other end to receive a suitable fitting 174 for connecting gas supply line 38.

A plurality of spaced vertical ports 176 are in communication with passage 172, each being threaded at its upper end to receive a suitable fitting 178 for connecting thereto one end of a delivery line 180. Each fitting 178 includes a manually operable valve 181.

In the apparatus illustrated, there are four injection assemblies 156. With particular reference now to Figs. 14 and 15, each injection assembly includes a rectangular block 182, also in the nature of a manifold, secured to base member 150 by screws 183, which appear also in Fig. 2. Each block 182 is bored centrally to provide a longitudinal passageway 184, threaded at one end to receive a plug 185 and at the other end to receive a suitable fitting 186 for connecting thereto the other end of a delivery line 180.

Each manifold block 182 is provided with a plurality of injection or nozzle assemblies 183, four being illustrated. Each nozzle assembly includes an annular member 188 provided with a horizontal flange portion 189, an upwardly extending boss portion 190, and a depending externally threaded portion 192.

It also includes a slightly tapered or funnel-shaped member 194, of somewhat resilient, or semi-rigid composition, such as rubber, the peripheral flange 195 of which is compressed between the lower face of portion 192, and the inturned and apertured flange 196 of a hollow nut 197.

The member 188 is secured to the block 182 by a circular series of screws 198, and is bored throughout to provide a vertical passageway 199, in fluid communication with bore 184 at its upper end via annular chamber 200, and at its lower end with outlet opening 202 in member 194.

From the foregoing description it should be apparent that the apparatus illustrated is designed to process sixteen containers simultaneously. Obviously, this number may be increased by the addition of more assemblies 156 and so on, as is understood.

In the event that at the end of a four hour run, there are but eight unprocessed containers remaining, two of the valves 181 may be closed, and so on.

Obviously, it is necessary that each container is positioned below one of the nozzle assemblies. Means to insure alinement and proper spacing are provided. Thus, in Fig. 17 there appears a specially designed tray 204, including a bottom 206, side walls 208, and end walls 210. The dimensions of this tray are such that eight containers C fit exactly and snugly therewithin.

With particular reference to Fig. 5, it is noted that on the upper face of bed 46, four guide strips are provided for each tray. These guides not only permit an attendant to quickly insert the loaded trays, but also serve to automatically position the containers accurately beneath the nozzles thereabove, when the distributor assembly is in elevated position.

The forward pair of guides 212 of each set are beveled, as at 214, to facilitate entry of the tray. The rearward pair of guides 216 of each set are similarly beveled as at 218, for the same reason. In addition, the latter are provided with integral inwardly extending abutment portions 220 which limit rearward movement of the trays. All of the guide members are rigidly and accurately attached to the bed 46 by means of screws 222, or otherwise.

It is noted that preferably, though not necessarily, the bed 46, the base member 150, the manifold blocks 182, and the nozzle assemblies with the exception of element 194, are of light weight material, such as aluminum, so that the burden borne by the piston 48 in reciprocable operation is reduced considerably.

As has been stated hereinbefore, the invention is practised in connection with containers provided with a valve of the type disclosed in the copending application, Serial No. 6,767.

In Fig. 16, such container C, and its associated valve assembly V, is portrayed in vertical section. The elements included in the assembly V are cup shaped and centrally apertured closure member a, hollow tubular stem b terminating in an enlarged flange portion c, rubber grommet or sealing element d, and a light compression spring e. Immediately above flange c, stem b is provided with a plurality of ports in communication with its hollow interior. Normally, spring e, interposed between a shoulder on the stem b and the bottom of closure a, maintains said stem in elevated position, so that the ports aforesaid are surrounded by said grommet.

With this arrangement, it is only by means of the application of an exterior force to the valve, that fluid communication between the interior of the container and atmosphere may be established.

It is also noted that the containers C, minus the assembly V, are furnished in quantities by others, and that the cream is introduced into said containers by standard apparatus, to which no claim is made herein. Nor is any claim made to the mechanism whereby the pre-assembled valve elements V are applied to each container.

The containers C illustrated, are of the twelve fluid ounce type, and the description will proceed on that premise.

Assuming that a supply of twelve ounce containers is at hand, a filling machine, also a supply of valve assemblies V, and a device for attaching the latter, each container has introduced thereinto seven fluid ounces of high quality pasteurized cream.

The temperature of the cream is critical. It should not be below 37, nor above 39 degrees Fahrenheit. A temperature of 38 degrees is ideal.

As the partially filled container is delivered from the filling machine, an attendant places thereon a valve assembly V, and then subjects the container to the action of a pneumatic press which quickly affixes said valve assembly.

Thereupon, the attendant deposits sixteen filled and valved containers in two trays 204, each of which as previously pointed out, is of such predetermined size that it will accommodate eight containers, and maintain them in proper position therein.

Assuming further, that this is the beginning of a cycle of operations, and with reference also to Fig. 1, the loaded trays 204 are now slid into place onto bed 46, guides 214 and 216 facilitating this operation. At this time, as is understood, the assembly 40, specifically the base plate 150 and assemblies 156 associated therewith, is in an elevated position, the attendant having at the close of the previous run depressed the "up" button of switch 42.

It should be mentioned at this point, that in the drawings, the apparatus 69 is illustrated throughout in operative position; that is to say, the base plate 150 is down, the condition of valve assembly V portrayed in Fig. 16 obtains, motor 50 is in operation, and piston 48 is at the end of one of its downward strokes.

With the two trays 204 now in place, the attendant depresses the "down" button of switch 42. The reversing mechanism, not shown because it is conventional, at once delivers air under pressure via line 164 to the interior of cylinder 160, below piston 158, whereby base plate 150, and all of the elements thereto affixed, descends so that a funnel member 194 engages the bottom of each closure member a.

Next, the attendant depresses the "on" button of switch 44 and the "start" button of switch 58. Gas from tank 20, assuming valve 24 is open, is instantaneously injected into each container C via line 22, now open solenoid valve 28, flexible line 38, manifold block 169, distribution lines 180, assuming valves 181 are open, injection assemblies 156, and nozzle assemblies 183. Momentarily thereafter, piston 48 begins its first cycle of vertical reciprocations.

The gas pressure must be approximately ninety pounds per square inch, as indicated on the regulatory gauge 26. When the assemblies 156 are down, each nozzle assembly 183 will occupy the position shown in Fig. 16, relative to the container. As the gas is forced downwardly through hollow stem b, it strikes the head c to depress the stem and thereby uncover the ports immediately thereabove.

Thus the gas is injected into the containers as indicated by arrows. The original turbulence thus engendered is continued by the rapid reciprocation of the containers. The timer is set to energize the motor 50 for exactly 30 seconds, and the speed reduction ratio between pulley 96 and pulley 97 is such that the eccentric 103 makes approximately 280 complete revolutions per minute.

Consequently, ideal fluffing of the cream is accomplished by 140 upward and 140 downward reciprocations of said piston in 30 seconds. It is to be understood of course, that slight variations are not critical, but it is noted that agitation for more than 31 seconds is apt to churn the cream into butter.

At the end of 30 seconds, timer device 52 automatically shuts off the motor 50, whereupon the attendant depresses the "off" button of switch 44, causing valve 28 to cut off the gas supply. Thereupon the "up" button of switch 42 is depressed, causing air under pressure via line 163 to enter cylinder 160 above piston 158 thereby to raise the base plate 150 and all of the elements thereto attached.

An attendant now removes the trays of processed containers, replaces them with two similar trays loaded with unprocessed containers, depresses the "down" button of switch 42, the "on" button of switch 44, and the "start" button of switch 58 and so on, to repeat the cycle, as is understood.

It is noted that, as soon as the gas supply is cut off by depressing the "off" button of switch 44, spring e raises valve stem b to bring the flange c firmly against the rubber grommet d, and thus to cover the ports formed in the stem immediately above said flange. Obviously, a considerable quantity of the gas is trapped within each container, and its pressure is at once exerted against the lower surface of the flanged head c to abet the spring e in hermetically sealing the fluffed cream within the container.

Processed containers are stored in a cool place, the whipped cream therein retaining its fluffiness indefinitely unless the containers are exposed to temperatures above forty degrees Fahrenheit for periods of time in excess of fifteen minutes.

Briefly therefore, optimum results are obtainable with pasteurized cream at 38 degrees Fahrenheit, a gas mixture of approximately 85 per cent nitrous oxide and fifteen per cent carbon dioxide at 90 pounds pressure, and agitation for 30 seconds at a reciprocatory rate of approximately 280 cycles per minute.

As to the apparatus, it is not considered necessary to further elaborate thereon. It should be evident that air pressure, via lines 163 or 164 respectively, cause cylinder 160, base member 150, and assemblies 156 to slide upwardly, or downwardly, on the guide pins 126.

It should also be evident that when piston 48 is reciprocated, all of the elements referred to in the preceding paragraph, including the guide pins, reciprocate with said piston. It is because of this, that lines 163, 164 and 180 are of flexible material, and of a length to accommodate these operations.

Obviously, the method, and the particular apparatus illustrated may be modified in some respects without departing from the principles of the invention, which is to be limited only by the appended claims.

What is claimed is:

1. Apparatus for reciprocating a plurality of containers filled partially with cream simultaneously with the injection thereinto of gas under pressure: said apparatus including a base; a casing secured to the base; a removable top cover for the casing; a vertically disposed piston slidably mounted within and supported by the casing; means including a motor mounted on the base within the casing for reciprocating said piston; means manually operable for starting said motor; means automatically operable for stopping the motor; a horizontally disposed container supporting bed plate rigidly secured to the upper end of said piston and reciprocable therewith; an opening in said cover to accommodate the bed plate; means on the bed plate for maintaining said containers in proper position thereon; a gas injection assembly reciprocal on vertical slide rods mounted on said cover; means manually operable for controlling the flow of gas to said assembly; air cylinder means for first lowering said assembly into charging position relative to said containers, for thereupon maintaining said assembly in that position during the reciprocating cycle of said piston, and for thereafter raising said assembly following the completion of said cycle; and means manually operable for controlling the action of said cylinder means.

2. The apparatus of claim 1 wherein said vertically disposed piston is slidably mounted in a cylinder open at either end and supported on a horizontally disposed plate rigidly mounted within the casing, and wherein said means including a motor mounted on the base within the casing for reciprocating said piston comprises: a first small pulley fixed to the motor shaft; a transverse shaft rotatable in spaced bearings; a bracket for supporting each bearing; a second larger pulley fixed to one end of the latter shaft; a driving connection between the first and the second pulley; an eccentric formed on the transverse shaft intermediate said bearings; a connecting rod the lower end portion of which surrounds said eccentric and the upper bifurcated end portion of which extends into said piston; a pair of alined horizontal openings in said bifurcated portion; an annular member secured within the upper end portion of the cylinder and forming the top thereof; a depending portion integral with the annular member and provided with a transverse opening in horizontal alinement with the openings in the bifurcated end portion of said rod; and a wrist pin passing through the latter openings, through the opening in the depending portion of the annular member, and into a pair of alined diametrically opposed openings provided in the wall of the piston aforesaid.

3. The apparatus of claim 1 wherein the horizontally disposed container supporting bed plate rigidly secured to the upper end of said piston and reciprocable therewith includes: a pair of spaced hollow bosses formed in said plate on the longitudinal centerline and equidistant from the transverse centerline thereof; an annular depression centrally of the plate; a vertically disposed guide pin passing through each of said bosses and projecting above and below said plate, each guide pin being secured in position by a set screw; a vertical rod the upper end of which is enlarged and provided with a threaded socket; an annular flange formed on the lower end of the rod; and means in the form of a split collar about said rod and having a snug fit in said annular depression for rigidly securing the flanged lower end of said rod to said plate, said collar being provided with an annular recess on its underside adapted to receive said flange, and being secured to the plate by screws passing through each of the two segments comprising said collar and into engagement with threaded apertures provided in the said plate.

4. In an apparatus for reciprocating a plurality of containers filled partially with cream simultaneously with the injection thereinto of gas under pressure: the combination with a depending rod having a stationary piston at its upper end and a threaded lower end, including an air cylinder construction surrounding said piston, of a vertical rod, a vertically reciprocable container supporting plate to which the lower end of said vertical rod is rotatably connected, and provided at its upper end with a threaded socket engaging said lower end of said depending rod; and a pair of spaced horizontal apertures in said rod for the insertion of a tool for rotating said rod to vary the distance obtaining between said stationary piston and said reciprocable plate.

5. In apparatus of the character described: gas distributor mechanism including a horizontally disposed base member; a pair of spaced apertured bosses provided on the base; a pair of similarly spaced vertically mounted stationary guide pins each passing through one of said bosses; air operable means mounted on the base for reciprocating the distributor mechanism vertically at intervals a predetermined distance; a plurality of transversely alined gas injection assemblies removably secured to said base in depending relation thereto; a distribution manifold in fluid communication with a gas supply; an individual flexible connection between said manifold and each injection assembly; and a manual valve associated with each flexible connection for controlling the flow of gas to each said assembly.

6. In apparatus of the character described, the gas injection assemblies recited in claim 5 each of which includes: a rectangular block in the nature of a manifold; a longitudinal passageway formed therein centrally thereof; a plug sealing one end of the passageway; a gas delivery fitting threaded into the opposite end thereof; a series of spaced annular chambers formed in the block, each chamber in fluid communication with said passageway; and a nozzle assembly associated with each said chamber, each nozzle assembly including: an annular member provided with a horizontal flange portion adapted to seat against the underside of said block and to be rigidly secured thereto; a first boss portion projecting upwardly from the flange portion into one of the annular chambers aforesaid, a second boss portion projecting downwardly from the flange portion and provided externally with threads, and a vertical passageway in fluid communication at its upper end with said chamber extending throughout said annular member; a semi-rigid funnel-shaped member provided at its upper end with an annular flange portion; and a hollow nut provided with an inturned and apertured flange portion adapted to engage the said downwardly projecting boss portion of the annular member, whereby to compress the flange portion of the funnel-shaped member between the lower face of the boss portion and the inturned flange portion of said nut, the body portion of the funnel-shaped member projecting through and beyond the inturned flange aforesaid of the hollow nut.

7. In combination with apparatus of the character described, said apparatus including a horizontally disposed vertically reciprocable bed plate for supporting a plurality of valved containers, and a plurality of vertically reciprocable gas injection nozzle assemblies: means for positioning the containers on said bed plate with the valve of each in vertical alinement with one of the nozzle assemblies, said means comprising: a tray including a bottom wall, side and end walls, the tray being of rigid material and of such dimensions as to exactly and snugly hold in mutiples of two a predetermined number of identical containers; a pair of spaced front guide members and a pair of similar rear guide members for the tray rigidly attached to the bed plate aforesaid; a bevelled face on each guide member for facilitating entry of the tray; and an integral inwardly extending abutment portion on each of the rear guide members for limiting the rearward movement of the tray.

8. In an apparatus for manufacturing whipped cream in the identical containers in which it is to be sold, said containers each being provided with a dispening valve: a vertically reciprocable horizontally disposed bed member for supporting a tray of such containers; guide means on the bed member for accurately positioning the tray; a gas injection nozzle, an air cylinder for lowering said nozzle into engagement with the valve of each container; means for introducing gas under pressure into each container via said nozzle in cooperation with the valve on the container; motor driven means for reciprocating said containers at a specific rate of reciprocation simultaneously with the injection thereinto of gas as aforesaid; manually operable means for controlling the movements of the air cylinder; a manual switch for starting the motor driven means; a timing device for automatically stopping the motor driven means following the elapse of a predetermined period of time; and manually operable means for controlling the flow of gas to said nozzles and thus to said containers.

FRED F. SUELLENTROP.

REFERENCES CITED

The following references are of record in the file of this patent:

UNITED STATES PATENTS

| Number | Name | Date |
|---|---|---|
| 1,126,865 | Read | Feb. 2, 1915 |
| 1,336,720 | Banling | Apr. 13, 1920 |
| 2,212,379 | Smith | Aug. 20, 1940 |
| 2,294,172 | Getz | Aug. 25, 1942 |
| 2,342,972 | Roy et al. | Feb. 29, 1944 |
| 2,435,682 | Getz | Feb. 10, 1948 |
| 2,478,212 | Thoms | Aug. 9, 1949 |
| 2,505,439 | Suellentrop | Apr. 25, 1950 |
| 2,505,799 | Smith | May 2, 1950 |